United States Patent Office 3,578,615
Patented May 11, 1971

3,578,615
EPOXY RESIN COATINGS HAVING IMPROVED CATHODIC DISBONDING RESISTANCE
Robert J. Moore, Short Hills, and Roy A. Allen, Iselin, N.J., assignors to Shell Oil Company, New York, N.Y.
No Drawing. Filed Apr. 8, 1968, Ser. No. 719,719
Int. Cl. C08g 30/12
U.S. Cl. 260—18
10 Claims

ABSTRACT OF THE DISCLOSURE

Epoxy resin powder coatings having improved cathodic disbonding resistance and which can be efficiently applied by fluidized bed techniques comprise (1) a polyepoxide, (2) an epoxy curing agent, (3) a catalyst, and (4) a suitable bonding additive hereinafter more fully described (e.g., barium sulfate, strontium chromate, o-nitrophenol, phosphoric acid, and aminosilanes).

BACKGROUND OF THE INVENTION

This invention relates to epoxy resin powder coatings which exhibit improved cathodic disbonding resistance.

The most common method of reducing corrosion underground is by the application of protective coatings; however, the principle of cathodic protection as applied to underground structures is rapidly becoming an important, if not dominant, method for protecting underground metallic pipelines. Fundamentally, cathodic protection consists of impressing an electromotive force on an underground structure in such a way as to make the entire structure cathodic with respect to the adjacent soil. This may be accomplished by using either auxiliary anodes to impress an emf from an outside source on the structure or by use of the sacrificial anode principle. In this manner, it will be appreciated that the structure is protected from corrosion at the expense of the anodes, which are easily and economically replaceable.

While cathodic protection of underground pipelines does substantially eliminate or significantly reduce the corrosion due to electrochemical phenomena, this method does not prevent direct chemical attack. It is generally known that corrosion due to direct chemical attack is ordinarily negligible; however, there is still the need to reduce the corrosion to the minimum possible. Therefore, there has been an increasing reliance on the use of both resinous coatings and cathodic protection to reduce corrosion.

There is a constant need to develop thermosetting resin coatings which cure relatively fast, i.e., less than a few minutes, while exhibiting the necessary degree of hardness, chemical resistance and flexibility required for coating of underground structures, particularly underground pipelines. A number of thermosetting resin compositions have been developed for use in coating underground pipelines such as the fluidized coating compositions disclosed in U.S. Pat. 3,344,096. While the coatings disclosed in U.S. 3,344,096 are excellent for coating underground pipes against chemical corrosion, they sometimes do not exhibit the necessary disbonding strength when the coated pipe is also protected by cathodic techniques.

A composition has now been found that not only is hard, flexible and chemically resistant, but also exhibits improved cathodic disbonding resistance.

SUMMARY OF THE INVENTION

The invention relates to coating compositions which exhibit excellent chemical resistance as well as cathodic disbonding resistance. More particularly, the invention relates to improved epoxy compositions which are especially suitable for coating metallic structures.

Specifically, the invention provides a fluidizable, heat-curable polyepoxide coating composition possessing improved cathodic disbonding resistance when applied to underground metallic piping.

DESCRIPTION OF THE PREFERRED EMBODIMENT

The present invention is particularly directed to fluidizable, heat-curable, rapid-curing polyepoxide coating compositions possessing improved cathodic disbonding resistance as well as excellent flexibility, hardness and chemical resistance and which consists essentially of a blended powder which comprises (1) a polyepoxide possessing at least one vicinal epoxy group per molecule, (2) an epoxy curing agent, (3) an epoxy curing catalyst, and (4) certain bonding additives such as ortho-nitrophenol, phosphoric acid, amino-silanes, and optionally (5) fillers.

The polyepoxide materials used in preparing the compositions of the present invention comprise those organic materials which have more than one vic-epoxy group, i.e., more than one

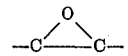

group, which group may be in a terminal position, i.e., a

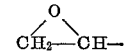

group or in an internal position, i.e., a

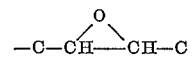

The polyepoxides may be saturated or unsaturated, aliphatic, cycloaliphatic, aromatic or heterocyclic and may be substituted with substituents, such as chlorine, hydroxyl groups, ether radicals, and the like.

Examples of such polyepoxides include, among others, 1,4-bis(2,3-epoxypropoxy)benzene,
1,3-bis(2,3-epoxypropoxy)benzene,
4,4'-bis(2,3-epoxypropoxy)diphenyl ether,
1,8-bis(2,3-epoxypropoxy)octane,
1,4-bis(2,3-epoxypropoxy)cyclohexane,
4,4'-bis(2-hydroxy-3,4'-epoxybutoxy)diphenyl dimethylmethane,
1,3-bis(4,5-epoxypentoxy-5-chlorobenzene,
1,4-bis(3,4-epoxybutoxy)-2-chlorocyclohexane,
1,3-bis(2-hydroxy-3,4-epoxybutoxy)benzene,
1,4-bis(2-hydroxy-4,5-epoxypentoxy)benzene.

Other examples include the epoxy polyethers of polyhydric phenols with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenol)propane (Bisphenol A), 2,2-bis(4-hydroxyphenol)butane, 4,4'-dihydroxybenzophenone, bis(4-hydroxynaphthalene. The halogen-containing epoxides may be further exemplified by 3-chloro-2,3-chloro-1,2-epoxyoctane, and the like. By varying the ratios of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of four suitable glycidyl polyethers of dihydric phenols is illustrated in U.S. 2,633,458 and are designated Polyethers A, B, C and D.

Another group of polyepoxides comprises the polyepoxypolyethers obtained by reacting, preferably in the presence of an acid-acting compound, such as hydrofluoric acid, or one of the afore-described halogen-containing epoxides, such as epichlorohydrin, with a polyhydric alcohol, and subsequently treating the resulting product with an alkaline component. As used herein and in the claims, the expressions "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inositol, trimethylolpropane, bis (4-hydroxycyclohexyl)dimethylmethane and the like.

The preparation of suitable such polyepoxide polyethers is illustrated in U.S. 2,633,458 as Polyether F.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products preferably have an epoxy equivalence greater than 1.0, and still more preferably between 1.1 and 4 and a molecular weight between 30 and 1,000.

Another group of polyepoxides include the epoxy esters of polybasic acids, such as diglycidyl phthalate and diglycidyl adipate, diglycidyl tetrahydrophthalate, diglycidyl maleate, epoxidized dimethylallyl phthalate and epoxidized dicrotyl phthalate.

Examples of polyepoxides having internal epoxy groups include, among others, the epoxidized esters of polyethylenically unsaturated monocarboxylic acids, such as epoxidized linseed, soyabean, perilla, oiticica, tung, walnut, and dehydrated castor oil, methyl linoleate, butyl linolinate, ethyl 9,12-octadecadienoate, methyl eleostearate, monoglycerides of tung oil fatty acids, monoglycerides of soybean oil, sunflower, rapeseed, hempseed, sardine, cottonseed oil, and the like.

Another group of the epoxy-containing materials having internal epoxy groups include the epoxidized esters of unsaturated alcohols having the ethylenic group in an internal position and polycarboxylic acids, such as, for example, di(2,3 - epoxybutyl)adipate, di(2,3 - epoxybutyl) oxalate, di(2,3 - epoxyhexyl)succinate, di(2,3-epoxyoctyl) tetrahydrophthalate, di(4,5-epoxy-dodecyl)maleate, di(2-3-epoxybutyl)terephthalate, di(2,3-epoxypentyl)thiodipropionate, di(2,3-epoxybutyl)citrate and di(4,5-epoxyoctadecyl)malonate, as well as the esters of epoxycyclohexanol, and epoxycyclohexylalkanols, such as, for example, di(2,3-epoxycyclohexylmethyl)adipate and di(2,3-epoxycyclohexylmethyl)phthalate.

Another group of materials having internal epoxy groups include epoxidized esters of unsaturated alcohols and unsaturated carboxylic acids, such as 2,3-epoxybutyl 3,4-epoxypentanoate, 3,4-epoxyhexyl 3,4-epoxypentanoate, 3,4-epoxycyclohexyl 3,4-cyclohexanoate, 2,3-epoxycyclohexylmethyl 2,3-epoxycyclohexanoate, and 3,4-epoxycyclohexyl 4,5-epoxyoctanoate, and the like.

Another group of materials having internal epoxy groups include epoxidized esters of unsaturated monocarboxylic acids and polyhydric alcohols, such as ethylene glycol di(2,3 - epoxycyclohexanoate), glycerol tri(2,3-epoxycyclohexanoate) and pentanediol di(2,3-epoxyoctanoate).

Still another group of the epoxy compounds having internal epoxy groups include epoxidized derivatives of polyethylenically unsaturated polycarboxylic acids, such as, for example, dimethyl 8,9,11,13-diepoxyeicosanedioate, dibutyl 7,8,11,12 - diepoxyoctadecanedioate, dioctyl 10,11-diethyl-8,9,12,13 - diepoxyeicosanedioate, dicyclohexyl 3,4,5,6 - diepoxycyclohexanedicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13 - eicosadienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene-styrene copolymers and the like.

Still another group includes the epoxidized hydrocarbons such as epoxidized 2,3-bis(cyclohexenyl)propane, 2,2-bis(cyclohexenyl)butane, 8,10-octadecadiene and the like.

Polyepoxides having an epoxy equivalent weight of between 400 and 4,000 are preferred. Polyepoxides having an average molecular weight above 500, as for example, between about 800 and 1,500 and between about 2,700 and 3,100 are especially preferred. Very suitable polyepoxides are those formed from an epihalohydrin, and particularly epichlorohydrin, and a polyhydric compound, such as 2,2-bis(4-hydroxyphenyl)propane or glycerol.

The polyepoxide which is used in the composition of the present invention may be entirely a solid grade of resin as are the Polyethers D and E, noted above, or may be a blend of resins in which one of them is a liquid grade, such as a polyepoxide having an epoxy equivalent weight of between 225 and 290 and an average molecular weight of between 450 and 500 as represented by Polyether A. Thus, a suitable mixture of polyepoxides is a mixture containing between 60% by weight of a solid polyepoxide derived from an epichlorohydrin and 2,2-bis(4-hydroxyphenyl)propane having an epoxy equivalent weight of between 1,650 and 2,050 and an average molecular weight of between 2,700 and 3,100 (see, for example, U.S. 2,633,458, column 6, line 74 to column 7, line 9) and between 40% and 20% by weight of a liquid polyepoxide derived from an epihalohydrin and diphenylol propane having an epoxy equivalent weight of between 175 and 210, and an average molecular weight of between 350 and 400 (Polyether A).

The polyepoxide may also be a blend of solid resins, and preferably a blend of a resin having a melting point higher than 100° C, and preferably a resin having a melting point below 80° C., and preferably a resin having a melting point in the range of 60–80° C., the melting point being determined according to Durrans' Mercury Method. Thus, another suitable mixture of polyepoxides is a mixture containing between 30 and 50% by weight of a solid polyepoxide derived from and epihalohydrin and diphenylol propane and having an epoxy equivalent weight of between 1,650 and 2,050, and a melting point of between 120 and 160° C. and between 50 and 70% by weight of a solid polyepoxide derived from an epihalohydrin and diphenylol propane having an epoxy equivalent weight of between 450 and 525, and a melting point between 60 and 80° C. (Polyether D).

Suitable epoxy curing agents include the benzophenone tetracarboxylic dianhydrides having the following structural formula:

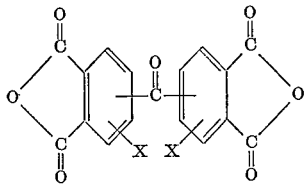

wherein X represents hydrogen, halogen, —NO₂, —COOH, —SO₃H or —NH₂ and may be the same or different radical.

Representative benzophenone tetracarboxylic dianhydrides include, among others, 3,3′,4,4′-benzophenone tetracarboxylic dianhydride; 2-bromo-3,3′4,4′-benzophenone tetracarboxylic dianyhydride; 2-carboxy-2′-sulfo-3,3′,4,4′-benzophenone tetracarboxylic dianhydride; 2-amino-2,3′,4,4′-benzophenone tetracarboxylic dianhydride; and 5-nitro-2,3′,3,4′-benzophenone tetracarboxylic dianhydride.

These dianhydrides may be prepared by oxidizing appropriate aryl compounds with nitric acid. In general, a nitric acid concentration of from about 5% to about 70% is employed and the amount may range from about 8.0 to about 17.0 on a molar ratio of 100% nitric acid relative to the aryl compound. The oxidation time can range from a few minutes to 2 or more days with from about 10 minutes to 2 hours generally employed. Temperatures of about 110° C. to about 350 C., with 150° C. to 250° C. being preferred, are employed. Since the oxidation reaction is preferably conducted in the liquid phase, pressures from about atmospheric to 500 pounds per square inch or higher are utilized. Upon completion of the oxidation reaction, the reaction mixture is allowed to cool, preferably down to about room temperature whereupon the reaction product precipitates out after from about 2 to 24 hours. These crystals of product are then separated from the liquid by any suitable means such as by filtration. The dried crystals are the dianhydrides utilized in the present compositions.

The aryl compounds which may be employed to produce the benzophenone tetracarboxylic dianhydrides of the present invention may be represented by the general structural formula:

$$\begin{array}{c} \text{Ar} \\ | \\ \text{H—C—R}_1 \\ | \\ \text{Ar} \end{array}$$

wherein Ar represents the same or different aryl radicals containing one or more rings and wherein at least one is an aromatic ring attached directly to the carbon atom in said formula, such as phenyl, biphenyl, naphthyl, phenanthryl, anthryl, indyl, dihydronaphthyl and cyclohexylphenyl, said radicals carrying as nuclear substituents at least two radicals defined by $R_1$, said latter radicals being located at least two positions away from said carbon in the formula; and $R_1$ is selected from the group consisting of primary, secondary, and tertiaryalkyls having from one to 16 carbon atoms, such as methyl, ethyl, n-propyl, isopropyl, isobutyl, amyl, isoamyl, hexyl, isooctyl, decyl, tetradecyl, hexadecyl and the like. The remaining positions on the aromatic rings can include radicals such as said diverse radicals defined hereinabove as well as alkyl groups having from one to 10 carbon atoms. It is critical in order to obtain the anhydrides useful in the present compositions that the nuclear substituents on the aromatic rings, defined above by $R_1$, be located at least two positions away from the carbon in the structural formula immediately above, otherwise the compounds produced will not be anhydrides but could be lactones.

Suitable aryl compounds which may be oxidized to produce dianhydrides useful in the present composition include, among others, 1,1′-bis(3,4,3′,4′-tetramethylphenyl)ethane,
1,1-bis(2,2′-dibromo-3,4,3′,4′-tetramethylphenyl)ethane
1-(3-methyl-4-ethylphenyl)-1,2′-nitro-3′,4′-diethylphenyl)ethane,
1,1-bis(3,4,3′,4′-tetramethyl-5-aminophenyl)ethane,
1,1-bis(3-ethyl-4-butylphenyl)isobutane,
1-(3,4-diethylphenyl) 1-(3′,4′-diisopropylphenyl)ethane,
1,1-bis(3,4,3′,4′-tetramethylphenanthryl)ethane,
1-(3-methyl-4-isopropyl-naphthyl),
1-(3′,4′-diethylanthryl)ethane, etc.

The preferred aryl compound is di-ortho-xylylmethane, which when oxidized with nitric acid at about 200° C, yields 3,3′,4,4′-benzophenone tetracarboxylic dianhydride.

Other suitable epoxy curing agents include the adducts of trimellitic anhydride represented by the general structural formula:

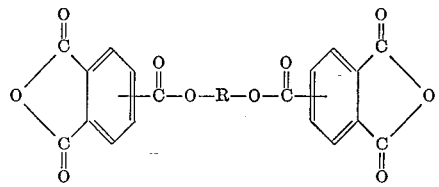

wherein R represents a hydrocarbon radical, preferably having from 2 to 12 carbon atoms, and wherein the aromatic nuclei may be substituted with one or more halogen atoms and/or one or more hydrocarbyl groups. Especially good results are obtained when the adduct is an adduct of trimellitic anhydride and a polyhydric alcohol, preferably a glycol, such as ethylene glycol.

Thus, an especially preferred trimellitic anhydride/ethylene glycol adduct is represented by the formula:

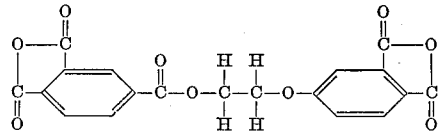

This and other trimellitic anhydride adducts may be prepared by any well-known techniques, such as by an acidolysis exchange reaction between trimellitic anhydride and a glycol diester.

Thus, a very suitable adduct may be prepared by reacting 2 moles of trimellitic anhydride with 1 mole of ethylene glycol diester (diacetic acid ester of ethylene glycol).

Still other suitable epoxy curing agents are the cyclic anhydrides such as pyromellitic dianhydride, Nadic® dianhydride, benzene/maleic dianhydride, cyclopentane dianhydride and styrene maleic dianhydride.

Particularly preferred are the cyclic anhydrides having at least one cyclic anhydride group, i. e.,

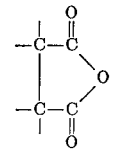

and a free carboxyl group, which is not more than 3 carbon atoms removed from the anhydride group. These anhydride compounds may be aliphatic, cycloaliphatic, or aromatic and may be saturated or unsaturated. Examples of these compounds include, among others, trimellitic anhydride, 1,2,3,-(6-methyl-4-cyclohexane)tricarboxylic 1,2-anhydride, 1,2,4-butane tricarboxylic 1,2-anhydride, 1,2,3,-pentane tricarboxylic 1,2-anhydride, 1,2,4-hexane tricarboxylic 1,2-anhydride, and 1,2,5-(3-chloroheptane) tricarboxylic 1,2-anhydride. Other examples include the half esters, and amides of pyromellitic anhydride, such as the monobutyl ester:

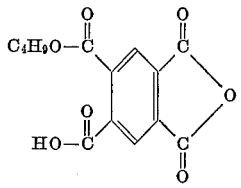

Trimellitic anhydride is particularly preferred because of the outstanding fast-curing, flexibility and solvent resistance obtained therewith.

Suitable catalysts include the stannous salts and the organo-substituted phosphines.

Stannous salts which are especially suitable for catalyzing the present compositions are the stannous salts of monocarboxylic acids having at least 5 carbon atoms, preferably fatty acids containing from about 5 to about 20 carbon atoms and more preferably from about 6 to 12 carbon atoms. Suitable stannous salts include, among others, stannous caprote, stannous octoate, stannous laurate, stannous palmitate, stannous stearate, stannous oleate, and stannous naphthenate. Stannous octoate is particularly preferred because it promotes exceptionally rapid cures and imparts outstanding flexibility as well as high impact strength and solvent resistance to the cured films.

The organo-substituted phosphines that may be used as catalysts may be exemplified by the formula $P(R)_3$ wherein at least one R is an organic radical and the other R's are hydrogen or organic radicals which may be the same or different from the first R. Preferred phosphines include the trihydrocarbyl phosphines, the dihydrocarboyl phosphines and monohydrocarbyl phosphines, such as tricyclohexyl phosphine, triphenyl phosphine, trioctyl phosphine, diphenyl cyclohexyl diphenyl phosphine, tributyl phosphine, trixylyl phosphine, tridodecyl phosphine, cyclohexyl octyl phosphine and the like. Particularly preferred phosphines include the trialkyl, the tricycloalkyl, the tri(alkylcycloalkyl), and the triaryl and each of the hydrocarbon radicals attached to the phosphorus atoms contains no more than 12 carbon atoms, and still more preferably no more than 8 carbon atoms, with a total number of carbon atoms preferably not being more than 30.

Of special importance, particularly because of their high degree of catalytic activity, are the aromatic hydrocarbyl phosphines such as triphenylphosphine although the aliphatic phosphines such as tributylphosphine may also be utilized effectively.

The preferred phosphine derivatives include the organic phosphonium halides having the general formula:

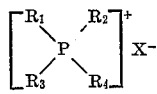

wherein $R_1$ is an organic radical, $R_2$, $R_3$, and $R_4$ is a hydrogen atom or an organic radical, and preferably an alkyl and/or aryl radical, and X is a halide, preferably chloride or bromide. Suitble organic phosphonium halides include, among others, tributyl phosphonium chloride, tributyl phosphonium bromide, triphenyl phosphonium chloride, triphenyl phosphonium bromide, methyl, dibutyl phosphonium chloride, methyl dibutyl phosphonium bromide, ethyl dibutyl phosphonium chloride, ethyl dibutyl phosphonium bromide, butyl diphenyl phosphonium chloride, butyl diphenyl phosphonium bromide, methyl diphenyl phosphonium chloride, methyl diphenyl phosphonium bromide, ethyl diphenyl phosphonium chloride and ethyl diphenyl phosphonium bromide.

The stannous salts and organic phosphine catalysts are beneficially employed in concentrations from about 0.05 to 5 parts by weight per one hundred parts by weight of polyepoxide (phr..) and preferably from about 0.5 to 2 parts per one hundred parts of polyepoxide.

Suitable additives which impart outstanding resistance to cathodic disbonding may be classified for convenience into two general categories, i. e., corrosion inhibitive and chemically inert.

Suitable additives include the sulfate, chromate and borate salts of the metals of Groups IIa and IVb such as calcium chromate, barium chromate, strontium chromate, lead chromate, lead silico-chromate, barium metaborate, and barium sulfate. Other suitable additives include the silanes and amino-silanes having the general formula:

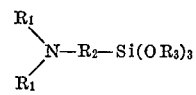

wherein $R_1$ is H or $CH_2CH_2OH$, $R_2$ is $(CH_2)_3$ or $(CH_2)_2NH(CH_2)_3$, $R_3$ is $CH_3$ or $C_2H_5$.

An especially good silane has the following general formula:

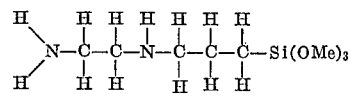

Still other suitable additives include phosphoric acid, mono- and dialkyl phosphates, ortho-nitrophenol, 2-nitrothiophene, alkoxyacetic acid, alkyl imidazolines, alkyl guanadines, alkyl morpholines, and similar chemical corrosion inhibitors.

In general, the additives may be utilized in amounts from about 0.01 to 10 parts per one hundred parts by weight of the polyepoxide (phr.) although from about 1 to about 5 phr. are preferably employed.

Suitable fillers which may be employed as desired include, among many others, aluminum powder, mica, bentonites, clays, synthetic resins and elastomers, ignited $Al_2O_3$, short-fiber asbestos, wood flour, carbon black, silica, zinc dust, talc and the like. A large number of fillers are available commercially in particle sizes from about 0.1 micron upward.

The quantity of fillers used is dependent upon many factors such as cost, particle size, particle shape, absorption characteristics and loading volume. The lightweight fillers such as asbestos and uncompressed mica are employed in ratios below 50 phr. (parts per one hundred parts of polyepoxide) and generally below 355 phr.; the medium weight fillers, such as talc and powdered aluminum, may be employed up to about 100 phr.; and the heavier fillers may be employed up to about 150 phr. In general, however, in order to optimize raw material costs without minimizing coating properties, the ratio of filler to polyepoxide ranges from about 10 to about 60 phr.

It has been discovered that when from 5 to 50 phr. of water-ground mica is employed as filler in the present compositions, the cathodic disbonding resistance of the composition is significantly better than when the other conventional fillers, such as silica sand, are employed. Therefore, when mica is employed, the amounts of additives hereinabove described may be significantly reduced, i.e., the amount of additive may be as low as 0.01 phr. and still provide adequate resistance to cathodic disbonding for some applications. A particularly effective combination included 5 phr. mica and 0.7 phr. o-nitrophenol.

It is generally desirable, although not necessary, to build a thixotroping agent to prevent dripping or sagging at high film build. Any of the thixotroping agents normally used in the art are suitable for use in the present compositions, including silica aerogels, bentonite clays and their derivatives, castor oil derivatives, and the like.

The proportions of the polyepoxide, epoxy curing agent, bonding agents, stannous salt of monocarboxylic acids, fillers, catalysts, thixotroping agents and their additives will vary within wide ranges; however, rapid cure and excellent film flexibility is achieved when the final composition comprises from about 50 to 80 parts by weight of polyepoxide and from about 5 to 20 parts by weight of the epoxy curing agent; from 1 to 25 parts per 100 parts of polyepoxide of a bonding agent; from about 0.1 to 5 parts of a stannous salt of a monocarboxylic acid; and, optionally, from about 5 to 30 parts by weight of filler.

The proportions of the polyepoxide, epoxy curing agent, catalyst, bonding additives, fillers, thiotripic agents and other additives will vary within wide ranges.

The polyepoxide and epoxy curing agent are employed in stoichiometrical or near-stoichiometrical amounts although up to a 50% excess of either reactant may be employed under some circumstances. Generally, the chemical equivalent ratio of polyepoxide to epoxy curing agent will range from about 1.0:1.50 to about 1.50:1.0 with from about 1.00:1.25 to 1.25:1.0 being preferred and from 1.0:1.1 to 1.1:1.0 being especially preferred.

The coating compositions of the present invention can be prepared as powders or in solution. When powders are desired, they can be prepared by both dry blending and fusion blending techniques.

Mixtures of cresylic acid with high boiling aromatic hydrocarbons have been found to be suitable solvents for preparing these coatings from solution.

In general, the average particle size of the powders may range from rather small particle sizes of, say, 5 microns or even smaller, to 600 microns or greater. An especially preferred range is between 40 and 175 microns.

Any of the conventional fluidized bed coating techniques may be employed wherein the fluidized bed comprises the instant compositions maintained in a dense turbulent condition by means of a gaseous stream continuously introduced into the fluidized bed. In general, in carrying out a fluidized bed coating process, the article is preferably heated to a temperature of at least 100° C., and preferably between about 120° and 250° C., before it is dipped into the fluidized bed. If an article is to be completely coated, it should of course be completely immersed in the fluidized bed. The article is preferably moved backwards and forwards in the bed, over a period of time determined by the desired thickness of coating. For the production of thin coatings, i.e., less than 0.015 inch thick, the period during which an article is dipped or immersed into the bed is usually less than 3 seconds.

After the article has been in contact with the fluidized bed for the desired time, it is removed, excess powder adhering to the article is preferably removed, and the coating cured by heating to at least 125° C., preferably between 150° and 250° C.

Because of the large sizes of articles, i.e., piping, structures, etc., the compositions of the present invention are preferably applied by spraying as by a compressed air spray gun, or more preferably, electrostatically, i.e., by maintaining a difference in electrostatic charge between the particles and the article to be coated.

It is important to note at this point that it is necessary that the article to be coated must be at a temperature which is high enough to fuse the powder applied and to cure the powder. Field applications to very large structures are generally not feasible; however, the parts may be conveniently pre-fabricated and coated in a shop for final assembly in the field.

The invention is illustrated by the following examples. The reactants, their proportions and other specific ingredients of the formulations are presented as being typical and various modifications can be made in view of the foregoing disclosure without departing from the spirit or scope of the disclosure or of the claims. Unless otherwise specified, parts and percentages disclosed are by weight.

DESCRIPTION OF TEST METHOD

The underground disbonding resistance was evaluated by the so called "Salt Crock Method." Essentially, a coated pipe specimen, with several 1/8" diameter holidays drilled in the coating, is immersed in an aerated 3% NaCl solution under a protective potenal of 2 volts. The test runs for 40 weeks, with the specimens being removed at 10-week intervals for the adhesion test. This test is performed by working a knife under the film from the holiday outward until the coating is no longer easily removed. This test is more severe on the tougher, more cohesive systems as the film itself is, in effect, part of the testing instrument; that is, a less cohesive film would break before it could be pried away from the substrate. It should be noted at this time that from the visual standpoint, which is generally used to evaluate such coatings in immersion tests, every one of the systems hereinafter tested appeared completely unaffected after 40 weeks' immersion.

Apparatus

1. Tank: A tank 17 inches high and 13½ inches in diameter, made of polyethylene or other water-resistant material was used.

2. Specimen holders: This is a circular Plexiglas plate, ¼ inch thick, with hole for anode in center, hole for air bubble tube about 1½ inches from anode, and 8 holes to accommodate 2⅜ inches OD pipe wih minimal play.

3. Anode: Pure titanium metal tubing, length 16 inches, ¾ inch OD, wall thickness 0.065 inch. Electrical lead clamped to anode and potted with epoxy system described under "test specimen."

4. Constant current output: A cathodic protection rectifier, air-cooled, selenium single phase 12 volt-29 amps is used (Harco Chemical Corporation). Voltage is checked by means of a vacuum tube voltmeter.

Bath constants

1. A negative potential of 2.0 volts (1.2 volts with respect to a $Cu/CuSO_4$ electrode) is impressed on the test specimen.

2. Electrolyte: 3% NaCl in distilled water, aerated at rate of 2 cubic feet per hour.

3. pH 8–9.

Test specimens

The test is run on 2⅜" OD pipe nipple 20" long, coated according to manufacturer's specification. A ⅛ inch hole is drilled through the upper end of the pipe and a lead connected by means of a small nut and bolt. Care is taken that good electrical contact is made, and the completed connection is coated with insulating varnish to prevent corrosion. The lower end of the pipe is potted with the following composition to exclude entry of electrolyte to pipe interior:

| | Parts (wt.) |
|---|---|
| Glycidyl polyether of 2,2-bis(4-hydroxyphenyl)-propane having an average molecular weight of 380 and an epoxide equivalent weight of about 190 | 100 |
| Versamide 140 (adduct of $C_{36}$-dimer acid and diethylenetriamine) | 80 |

Four ⅛" diameter holidays are drilled in the coating down one side of the pipe, 3" apart. When apparatus is set up, these holidays should face the anode.

Disbonding test

To determine the degree of disbonding, the coating-to-metal bond surrounding the holiday is checked by working a sharp knife under the film and removing any of the coating which has lost adhesion. This is continued, working outward from the center, until the coating can no longer be removed with ease. The area of the disbonded region, usually circular in shape, is then traced and its area measured. This evaluation is run at 10-week intervals during the test which runs for 40-weeks.

Preparation of powders

All ingredients are charged into a 1½ gallon jar mill containing 5500 grams of cylindrical high density porcelain grinding media and ground for 20 hours.

Application of pipe coatings

The following procedure was used to apply the coatings described in the following examples.

1. Pipe nipples, 2⅜″ OD, 3/16″ wall thickness, 24″ long were allowed to come to temperature for 45–60 minutes in an oven maintained at 470° F.
2. To apply the coating, the pipe was removed and electrostatically sprayed with the powder coating system to a film thickness of 10–15 mils. A Sames Model No. 1 "Stajet" Type hand gun was used.
3. The coated specimen was returned to the oven for a period of three minutes after which it was removed from the oven and cooled by quenching.

EXAMPLE I

Eight hundred grams of the following components were charged into a 1½ gallon jar mill containing 5500 grams of cylindrical high density porcelain grinding media, ground from 20-hours, and applied electrostatically as described hereinbefore.

| Compound: | Percent my weight |
|---|---|
| Polyepoxide (a glycidyl polyether of 2,2-bis (4-hydroxyphenyl)propane having a melting point of 98° C., an average molecular weight of 1400 and an epoxide value of 0.103 eq. (100 g.), hereinafter referred to as Polyepoxide X | 58.73 |
| Trimellitic anhydride | 9.93 |
| Filler and pigments— | |
| Silica 219 (a fine silica sand) | 27.50 |
| Titanium dioxide R–610) | 1.00 |
| Molybdate orange (YE 421) | 1.50 |
| Stannous octoate | 1.18 |
| Defoamer (PC–1344, 60% xylene) | 0.16 |
| | 100.00 |

Curing agent stoichiometry (eq. anhydride/eq. epoxy) 100—125%
Pigment concentration (inert plus color), percent w.—30%
Catalyst level (phr.)—2

Silica 219 is a fine ground and screened crystalline silica of excellent color and uniformity having the following typical properties:

Color—White
Brightness—89–90
Specific gravity—2.65
Oil absorption (rub-out)—18
Sieve fineness:
 Thru 200 mesh—99.9%
 Thru 325 mesh—98.5%
Hegeman fineness—3
pH 8–9

The above procedures were substantially repeated wherein the above formulation contained no filler and pigment. The above procedures were again substantially repeated wherein the silica 219 was replaced successively with a quantity of each of the following:

(1) 325 mesh waterground mica (English Mica Co.)
(2) Barytes (Thompson Weinman Co.)
(3) Barium metaborate (Thompson Weinman Co.)
(4) Lead silico-chromate, Busan 11
(5) Barium chromate (National Lead Co.)
(6) Strontium chromate (Harshaw Co.)

The results of the tests are tabulated in Table I.

TABLE I

| | Disbonding area (square inches) | | | |
|---|---|---|---|---|
| Duration of the test (weeks) | 10 | 20 | 30 | 40 |
| Filler: [a] | | | | |
| No filler or pigment | 0.62 | 1.08 | | |
| Barium metaborate [b] | 0.01 | 0.41 | 1.13 | |
| Barytes [b] | 0.01 | 0.22 | 1.02 | |
| Strontium chromate [b] | 0.08 | 0.28 | 0.54 | 1.04 |
| Lead silico-chromate [b] | 0.04 | 0.15 | 0.52 | 1.08 |
| Silica [b] | 0.05 | 0.18 | 0.37 | 0.62 |
| Barium chromate [b] | 0.00 | 0.04 | 0.21 | 0.35 |
| Mica [c] | 0.00 | 0.01 | 0.02 | 0.03 |

[a] The two color pigments, titanium dioxide and molybdate orange were present in all formulations, but are considered to have no functional value except to impart color. Other tinting pigments can be used interchangeably.
[b] 30% pigment level.
[c] 20% pigment level.

EXAMPLE II

The procedures of Example I were substantially repeated wherein the following formulation was used:

| Component: | Percent by weight |
|---|---|
| Polyepoxide X | 70.21 |
| 3,3′,4,4-benzophenone tetracarboxylic dianhydride | 8.96 |
| Filler and pigments— | |
| Silica 219 | 17.47 |
| Titanium dioxide | 1.00 |
| Molybdate Orange | 1.50 |
| Stannous octoate | 0.70 |
| Defoamer (PC–1344, 60% in xylene) | 0.16 |
| | 100.00 |

Curing agent stoichiometry (eq. anhydride/eq. epoxy 100—75%
Pigment concentration, percent w.—20%
Catalyst level (phr.)—1

The results of the disbonding tests are tabulated in Table II.

TABLE II

| | Disbonding area (square inches) | | | |
|---|---|---|---|---|
| Duration of the test (weeks) | 10 | 20 | 30 | 40 |
| Silica [a] | 0.19 | 0.60 | 0.96 | >1.00 |

[a] 30% pigment level.

EXAMPLE III

The procedures of Example I were substantially repeated except that 1 phr. of triphenyl phosphine was used in lieu of 2 phr. of stannous octoate. The comparative results are tabulated in Table III.

TABLE III

| | Disbonding area (square inches) | | | |
|---|---|---|---|---|
| Duration of the test (weeks) | 10 | 20 | 30 | 40 |
| Filler: | | | | |
| No filler or pigment | 0.68 | 1.10 | | |
| Barium metaborate [a] | 0.00 | 0.99 | 0.31 | 0.42 |
| Barytes [a] | 0.23 | 0.31 | 0.58 | 1.10 |
| Strontium chromate [a] | 0.40 | 0.59 | >1.00 | |
| Lead silico-chromate [a] | >1.00 | | | |
| Silica [a] | >1.00 | | | |
| Barium chromate [a] | 0.08 | 0.24 | 0.52 | 0.68 |
| Mica [b] | 0.08 | 0.12 | 0.13 | 0.15 |

[a] 30% pigment level.
[b] 20% pigment level.

EXAMPLE IV

The procedure of Example I was substantially repeated in the following experiments:

(A) Composition of Example I.
(B) Composition of Example I wherein 1 phr. of Silane A–1120.

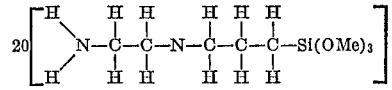

is additionally added.

(C) Composition of Example I wherein 0.3 phr. of Silane Z–6020 (N - beta - aminoethyl-gamma-aminopropyl trimethoxysilane) is additionally added.

(D) Composition of Exampe I wherein 1 phr. of Silane A–1120

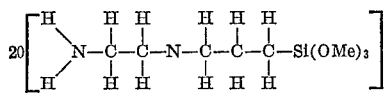

is additionally added and triphenyl phosphine is used in lieu of stannous octoate.

The comparative results are tabulated in Table IV.

TABLE IV

| Duration of the test (weeks) | Disbonding area (square inches) | | | |
|---|---|---|---|---|
| | 10 | 20 | 30 | 40 |
| Composition: | | | | |
| A | 0.05 | 0.18 | 0.37 | 0.62 |
| B | 0.08 | 0.13 | 0.20 | 0.30 |
| C | 0.00 | 0.03 | 0.12 | 0.30 |
| D | 0.15 | 0.19 | 0.22 | 0.30 |

EXAMPLE V

The procedures of Example I were substantially repeated in the 10 following experiments:

(E) Composition of Example I.

(F) Composition of Example 1 wherein 1 phr. of phosphoric acid is additionally added.

(G) Composition of Example I wherein 1 phr. of phosphoric acid is additionally added and triphenyl phosphine is used in lieu of stannous octoate.

(H) Composition of Example I wherein 1 phr. o-nitrophenol is additional added.

The comparative results are tabulated in Table V.

TABLE V

| Duration of the test (weeks) | Disbonding area (square inches) | | | |
|---|---|---|---|---|
| | 10 | 20 | 30 | 40 |
| Composition: | | | | |
| E | 0.05 | 0.18 | 0.37 | 0.62 |
| F | 0.04 | 0.06 | 0.08 | 0.16 |
| G | 0.07 | 0.10 | 0.12 | 0.12 |
| H | 0.01 | 0.06 | 0.10 | 0.11 |

We claim as our invention:

1. A fluidizable, heat-curable, rapid-curing polyepoxide coating composition possessing excellent cathodic disbonding resistance comprising a blended powder which comprises
   (1) a polyepoxide possessing at least one vicinal epoxy group per molecule,
   (2) an epoxy curing agent selected from the group consisting of (a) benzophenone tetracarboxylic dianhydrides and (b) cyclic anhydrides having at least one cyclic anhydride group and a free carboxyl group which is not more than 3 carbon atoms removed from the aphydride group.
   (3) an epoxy curing catalyst selected from the group consisting of organo-substituted phosphines, organic phosphonium halides and stannous salts of monocarboxylic acids having from about 5 to about 20 carbon atoms, and
   (4) a disbonding additive combination comprising (a) silica and (b) a compound selected from the group consisting of phosphoric acid and orthonitrophenol.

2. A composition as in claim 1 wherein the polyepoxide is a glycidyl polyether of a polyhydric phenol or polyhydric alcohol.

3. A composition as in claim 2 wherein the polyepoxide is a glycidyl polyether of 2,2-bis(4-hydroxyphenyl)propane.

4. A composition as in claim 1 wherein the epoxy curing agent is trimellitic anhydride.

5. A composition as in claim 1 wherein the stannous salt is stannous octoate.

6. A composition as in claim 1 wherein the epoxy curing agent is triphenyl phosphine.

7. A composition as in claim 1 wherein the chemical equivalent ratio of polyepoxide to epoxy curing agent is from about 1.01:1.50 to 1.50:1.0.

8. A composition as in claim 1 wherein the epoxy curing agent is employed in amounts from about 0.1 to 5 parts per one hundred parts by weight of polyepoxide.

9. A composition as in claim 1 wherein the bonding agent is utilized in amounts from about 0.1 to 25 parts by weight per one hundred parts of polyepoxide.

10. A composition as in claim 1 wherein the composition additionally comprises from 5 to 50 parts by weight of an inert filler.

References Cited

UNITED STATES PATENTS

| 3,404,195 | 10/1968 | Weinrich | 260—37X |
| 3,400,098 | 9/1968 | Parry | 260—37 |
| 3,390,123 | 6/1968 | Frichette | 260—37X |
| 3,384,610 | 5/1968 | Lee | 260—37 |
| 3,374,193 | 3/1968 | Tsatsos et al. | 260—18 |
| 3,344,096 | 9/1967 | Manasia et al. | 260—18 |
| 3,336,251 | 8/1967 | Manasia | 260—18 |
| 3,102,043 | 8/1963 | Winthrop et al. | 260—37X |
| 3,256,135 | 6/1966 | Weinheimer et al. | 260—37 |

OTHER REFERENCES

Organic Coating Technology, vol. II, H.F. Payne, John Wiley & Sons, N.Y., 1961, p. 835.

"Silane Coupling Agents," Dow Corning, 1967, pp. 1, 4, 5, 12 to 14, 25 and 26.

DONALD E. CZAJA, Primary Examiner

C.W. IVY, Assistant Examiner

U.S. Cl. X.R.

117—21, 93.4, 128.7; 260—37, 47, 78.4